Oct. 31, 1967  E. W. MERRILL ETAL  3,349,606
VISCOMETERS
Filed March 10, 1965  2 Sheets-Sheet 2
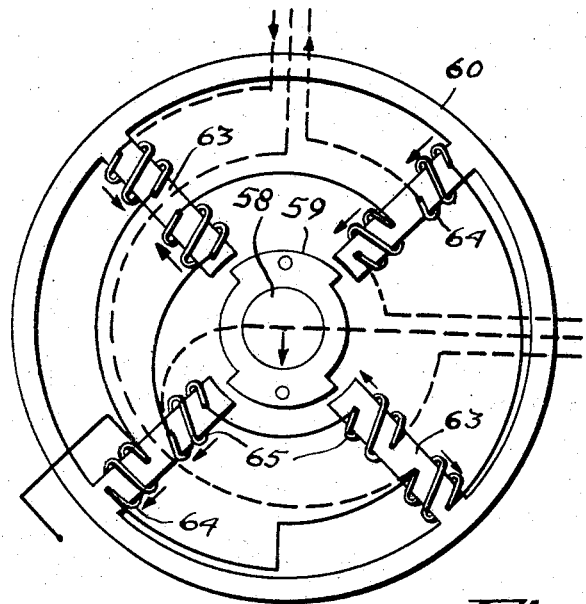
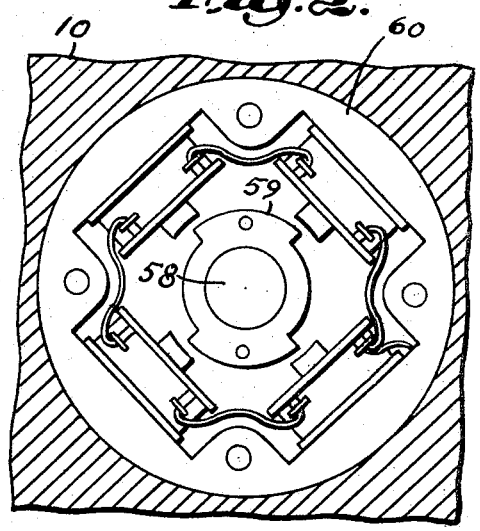
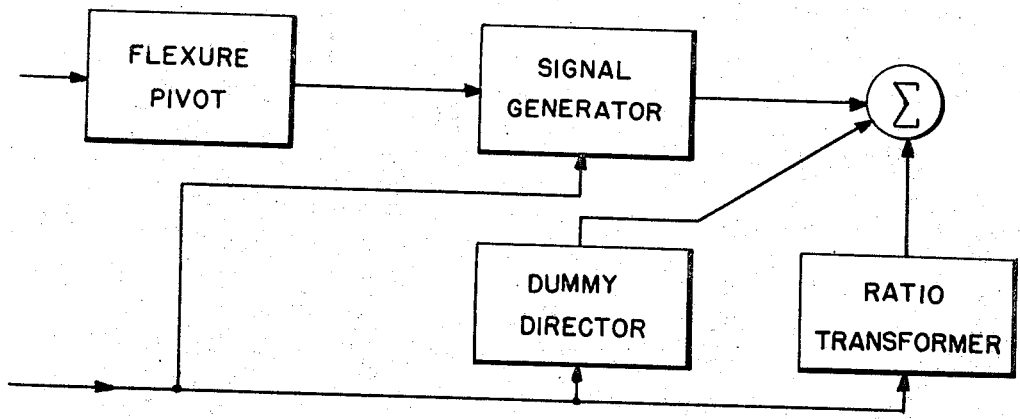
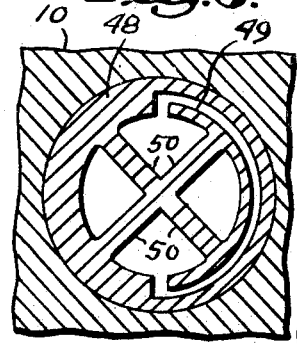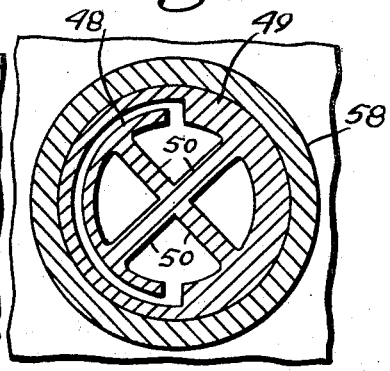

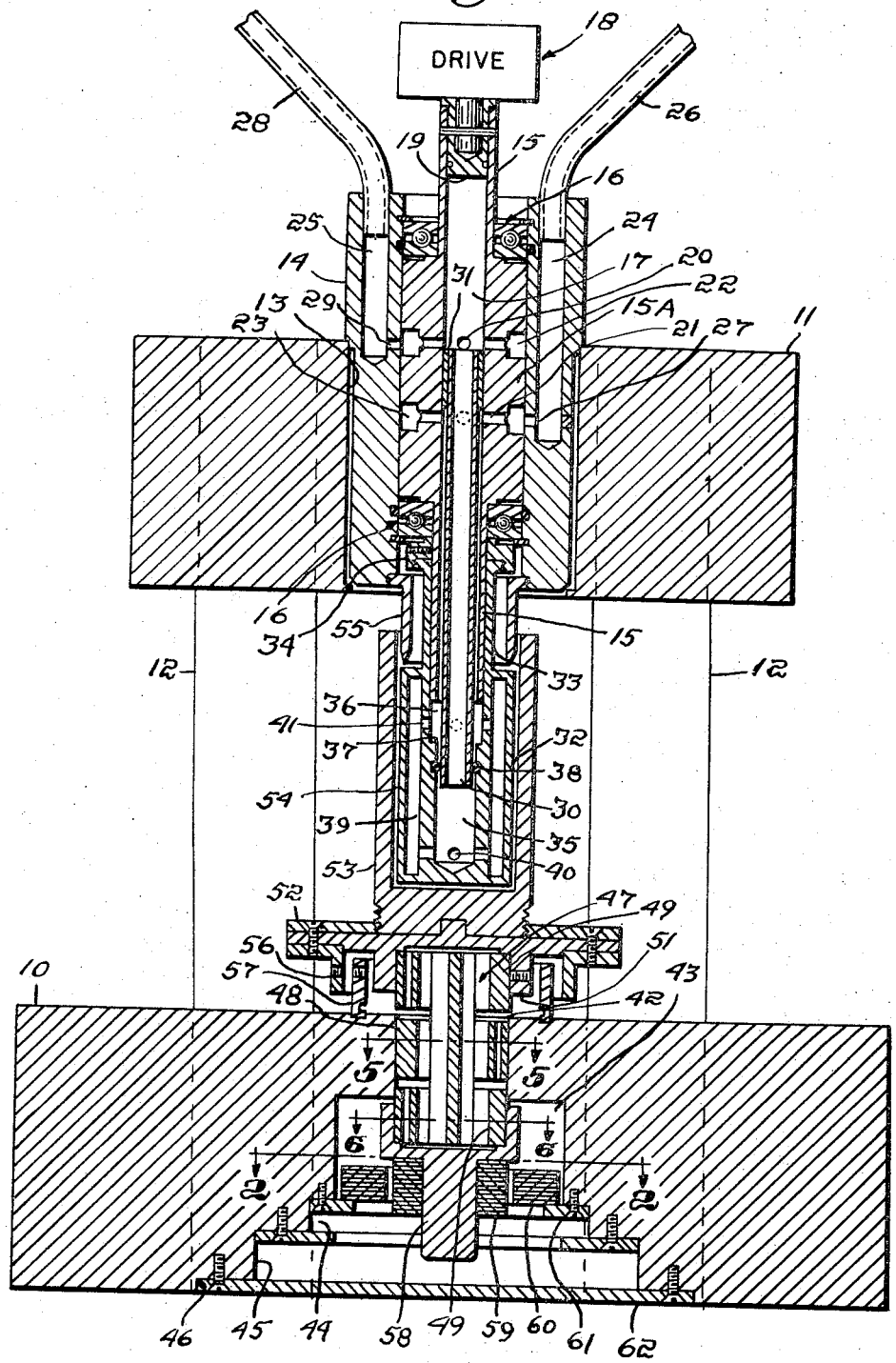

3,349,606
VISCOMETERS
Edward W. Merrill, 56 Stone Road, Belmont, Mass.
02178; Edward Eugene Shaw, 342 W. Caley
Ave., Littleton, Colo. 80120; Neil R. Chambers,
1 Birchwood Ave., West Peabody, Mass. 01960;
and Charles R. Dauwalter, 56 Hinckley Road,
Waban, Mass. 02168
Filed Mar. 10, 1965, Ser. No. 438,597
2 Claims. (Cl. 73—60)

ABSTRACT OF THE DISCLOSURE

A viscometer having first and second elements providing an annular space for liquid, the first element being driven and the second element being supported by pivot means against axial movement and yieldably opposing its turning and the rotor of a signal generator being carried by the pivot means.

---

The present invention relates to viscometers of the type having first and second relatively rotatable, coaxial elements shaped, dimensioned, and disposed to provide an annular space for the liquid, the viscosity of which is to be measured.

In such viscometers, the first element is driven and the second element turns in response to the viscous drag of the liquid. The requirement is for such a Couette type viscometer that is capable of measuring the viscous properties of liquids, especially non-Newtonian liquids, over a wide range of shear (shear rate proportional to the rotational speed of the first element) or over a wide range of shear stresses (shear stresses proportional to the torque produced on one of the elements). In commercially available viscometers of this type, it is the practice to change torsion springs or other torque measuring devices to suit the particular liquid being tested. As the second element is supported by bearings to maintain the concentric and vertical relationships between the elements, viscometers of the type under discussion are not as accurate as is often desired since, regardless of the measuring means employed, the drag of the bearings is an indistinguishable but real factor in the meausrement. It is, accordingly, impossible to measure torque accurately at low levels comparable to the frictional drag of bearings.

A principal objective of the present invention is to provide viscometers of the above type that are characterized by increased accuracy. In accordance with the invention, this objective is attained by attaching the second element to a pivot member which is connected to a fixed mount by resilient means which permit the member to turn through small angles relative to the mount and coaxially with respect to the elements with the resilient means preventing axial movement of the pivot member relative to its mount. While the resiliency of the means opposing the turning of the pivot affects the measurements of the viscosity of a fluid, its spring constant factor is one for which viscosity reading instruments can be accurately adjusted enabling viscometers of the type under consideration to be made that are capable, for example, of measuring torque over a six decade range without mechanical changes while at the same time permitting the achievement of measurements down to torque levels of 0.1 dyne-centimeter, with a resolution of ±.01 dyne-centimeter.

In measuring viscosity, a signal generator of the microsyn type has the advantage that it provides signals that are proportional to small angular displacements of its rotor relative to its stator. If the rotor of such a generator is mounted to turn coaxially with the second element, the signal will be in proportion to the viscosity of the fluid between the two elements. A further object of the invention is, accordingly, the provision of a viscometer in which the rotor of such a generator is fixed to the pivot member with the maximum angular displacement of the pivot member permitting rotor movement that provides the full range of signals generated for use in measuring torque.

In the accompanying drawings, there is shown an illustrative embodiment of the invention from which these and other of its objectives, novel features, and advantages will be readily apparent.

In the drawings:

FIGURE 1 is a vertical section of a viscometer in accordance with the invention, FIGURE 2 is a section, on an increased scale, taken approximately along the indicated lines 2—2 of FIGURE 1 to show the microsyn, FIGURE 3 is a somewhat schematic view of the wiring of the microsyn, FIGURE 4 is a view illustrating the viscosity measuring circuitry in block form, and FIGURES 5 and 6 are sections taken along the indicated lines 5—5 and 6—6, respectively, of FIGURE 1.

The viscometer illustrated by the drawings has a base 10 and a top plate 11 connected thereto by supports 12.

The top plate is provided with a bore 13 for the housing 14 in which a shaft 15 is rotatably supported by axially spaced ball bearing assemblies 16. The shaft 15 has an axial passage 17 extending therethrough and its upper end, to which a generally indicated drive 18 is connected, is closed by a cap 19. The drive 18 may be of any type but preferably provides a suitable range of speeds. The lower end of the shaft 15 is shown as extending below the top plate 11.

Between the bearings 16, the shaft 15 has a portion 15A closely fitting the bore 13 and provided with axially spaced radial ports 20 and 21 opening into annular grooves 22 and 23, respectively. The housing 14 has lengthwise bores 24 and 25 with the bore 24 being connected to a water delivery conduit 26 and having a port 27 opening into the annular groove 23 and the bore 25 connected to a water return conduit 28 and having a port 29 opening into the annular groove 22.

A tube 30 whose outside diameter is less than the diameter of the shaft passage 17 is supported with its upper end below the ports 20 by a bushing 31 positioned between the ports 20 and 21 and blocking water flow between them. The tube 30 is so dimensioned that its lower end protrudes beyond the lower end of the shaft 15.

A cylindrical bob 32 has an axial stem 33 threaded into a collar 34 anchored to the shaft 15. The stem 33 has an axial bore 35 establishing a well within the bob 32, and a counterbore 36 dimensioned to fit the shaft 15 and providing a shoulder 37. The tube 30 extends into the bore 35 and a seal 38, conveniently of the O-ring type, blocks leakage between the well and the counterbore 36. The bob 32 has an annular chamber 39 provided with ports 40 and 41 opening into the well and the counterbore, respectively.

By this construction, the temperature of the bob 32 may be maintained at a desired level, while it is rotating, by the circulation of water therethrough from a source, not shown, whose temperature is thermostatically maintained.

The base 10 has a bore 42 coaxial with the bore 13 and counterbores 43, 44, 45, and 46. A generally indicated pivot 47 includes a mount 48 fixed in the bore 42 and a pivot member 49 extending therethrough with one end exposed above the base 10 and its other end exposed in the chamber established by the counterbore 43. The pivot 47 also includes a connector, shown as of X-shaped cross section, between the mount 48 and the pivot member 49 which provides four resilient reeds 50 extending the length of the pivot and interconnected at its axis. The two reeds 50 are anchored to the mount 48 and the other two reeds 50 are anchored to the pivot member 49. The pivot 47 is of the type made by The Bendix Corporation at its Utica Division and are called "Free-Flex" pivots. Such pivots not only hold the pivot member 49 coaxially with respect to the bob 32, yieldably oppose its turning, and prevent its axial movement but also permit small angular displacement of the pivot member, say 5° or less.

An adaptor 51, secured to the upper end of the pivot member 49, has a clamping ring 52 into which the base of the cylindrical cup 53 is threaded. The cup 53 and the bob 32 are coaxial with the bob 32 within the cup 53 and their two cyindrical surfaces are dimensioned to provide an annular space 54 for the liquid, the viscosity of which is to be measured at a temperature controlled by the water circulating through the bob 32. A splash ring 55, threaded into the lower end of the housing 14, is dimensioned to fit closely but freely within the upper end of the cup 53. A splash guard 56 depends from the undersurface of the adaptor 51 and fits closely but freely within a splash guard 57 fixed on the base 10.

An adaptor 58 is secured to the lower end of the pivot member 49 and the rotor 59 of a microsyn is fixed thereon in the chamber established by the counterbore 43. The microsyn stator 60 is held by a clamping ring 61 and the lower counterbore 46 is closed by a plate 62. As a microsyn is conventional, it is not herein detailed other than to note that its poles 63 have primary windings 64 and secondary windings 65, see FIGURE 3. The secondary output signal is proportional to the movement of the rotor relative to the stator and within the limits permitted by the pivot 47, the signals range from zero to a maximum. As the signals are proportional to the turning of the pivot member 49, they are also proportional to the relative movement between the cup 53 and the bob 32 and, accordingly, to the torque.

Various means may be used to measure the signals, depending on the accuracy that is wanted, but such form no part of the present invention. By way of example and as shown in FIGURE 4 the circuitry may include a dummy director by which the null voltage of the microsyn is aligned with the zero torque position of the pivot 47 and a ratio transformer calibrated to permit the direct readout of the applied torque allowing, for example, direct reading of steady-state torque levels over a range of $10^{-5}$ to 1 of calibrated torque levels. Torque deviations of $10^{-5}$ to 1 about any steady-state level in the calibrated range may be read on a torque deviation readout meter such as a phase sensitive voltmeter.

We claim:

1. In a viscometer, two relatively rotatable, coaxial elements, one within the other and dimensioned relative thereto to provide an annular space for the liquid the viscosity of which is to be measured, means to rotate one element, a base, pivot means axially of said elements, said pivot means including a series of flexible resilient reeds of substantial length joined together along their inner edges to provide the pivot axis, a mount secured to said base between the ends of the reeds and secured to the outer edges of some of the reeds, and a pivot secured to the outer edges of the other reeds, the other of said elements being secured to the upper end of said pivot and supported by said pivot means against axial movement, and a circuit including fixed and movable parts operable on small angular displacements of said movable part to generate signals proportional to such displacements, the movable part being fixed on the lower end of the pivot to turn therewith.

2. The viscometer of claim 1 in which the fixed and movable parts of the circuit are the stator and rotor of a microsyn, the microsyn rotor being coaxial with the pivot axis.

References Cited

UNITED STATES PATENTS

| | | | |
|---|---|---|---|
| 2,977,790 | 4/1961 | Dubsky et al. | 73—60 |
| 3,027,749 | 4/1962 | Barnard | 73—9 |
| 3,285,057 | 11/1966 | De Zurik | 73—59 |

FOREIGN PATENTS

| | | |
|---|---|---|
| 672,380 | 10/1963 | Canada. |
| 764,850 | 3/1955 | Great Britain. |

DAVID SCHONBERG, *Primary Examiner.*